A. HOCHSTRASSER.
CEMENT SCRAPER
APPLICATION FILED FEB. 7, 1914.

1,114,986.

Patented Oct. 27, 1914.
2 SHEETS—SHEET 1.

WITNESSES:

INVENTOR

Arnold Hochstrasser
BY
ATTORNEY.

A. HOCHSTRASSER.
CEMENT SCRAPER.
APPLICATION FILED FEB. 7, 1914.

1,114,986.

Patented Oct. 27, 1914.

2 SHEETS—SHEET 2.

WITNESSES:

INVENTOR

Arnold Hochstrasser
BY
Augustus B. Stoughton,
ATTORNEY.

UNITED STATES PATENT OFFICE.

ARNOLD HOCHSTRASSER, OF CEMENTON, PENNSYLVANIA, ASSIGNOR TO WHITEHALL CEMENT MANUFACTURING COMPANY, OF PHILADELPHIA, PENNSYLVANIA, A CORPORATION OF PENNSYLVANIA.

CEMENT-SCRAPER.

1,114,986.   Specification of Letters Patent.   Patented Oct. 27, 1914.

Application filed February 7, 1914. Serial No. 817,134.

*To all whom it may concern:*

Be it known that I, ARNOLD HOCHSTRASSER, a citizen of the United States, residing at Cementon, in the county of Lehigh, State of Pennsylvania, have invented a new and useful Cement-Scraper, of which the following is a specification.

The principal object of the present invention is to provide an efficient, comparatively inexpensive and reliable cement scraper; to provide for making the scraper positively go in or up to its work; to provide a construction adapted for scraper plates of any width; to provide a scraper in the operation of which the scraper plate is forced through the cement until it takes a bearing on the floor and is thereafter drawn back bringing with it all the cement which the plate will hold; and to provide a scraper which is so largely automatic in its operation that it can be operated even by unskilled labor.

The invention will be claimed at the end hereof but will be first described in connection with the embodiments of it chosen from other embodiments for illustration in the accompanying drawings in which—

Figure 1:
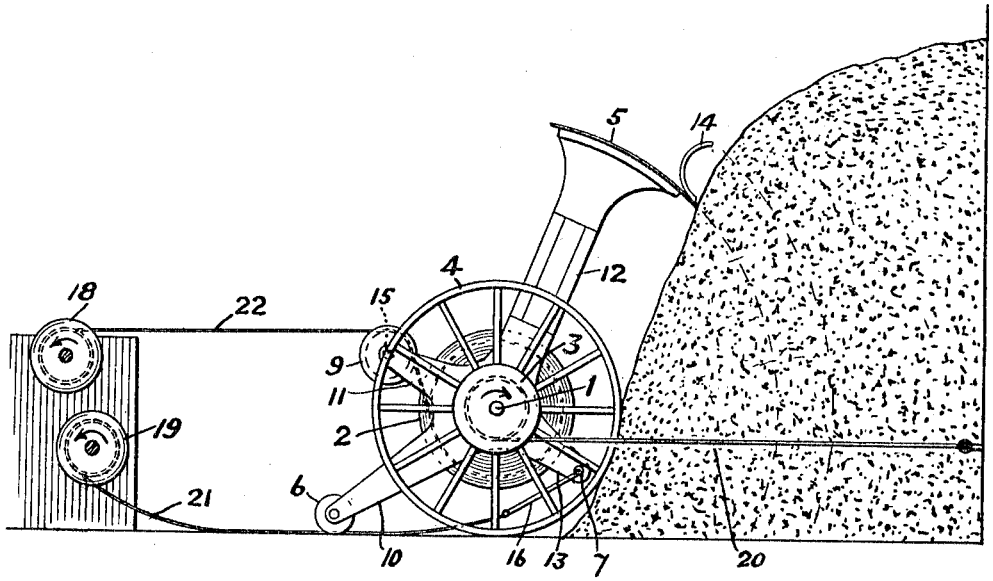
Figure 2:
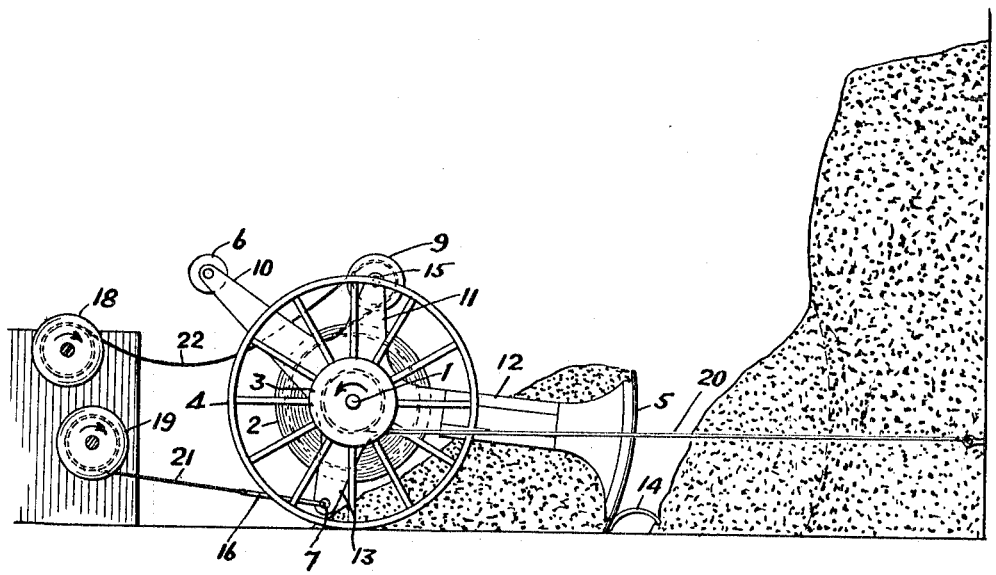
Figure 3:
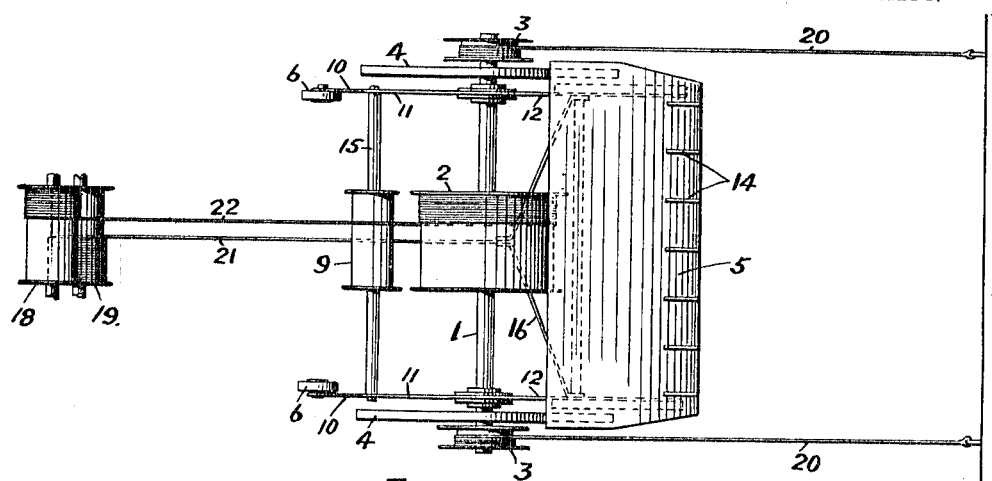
Figure 4:
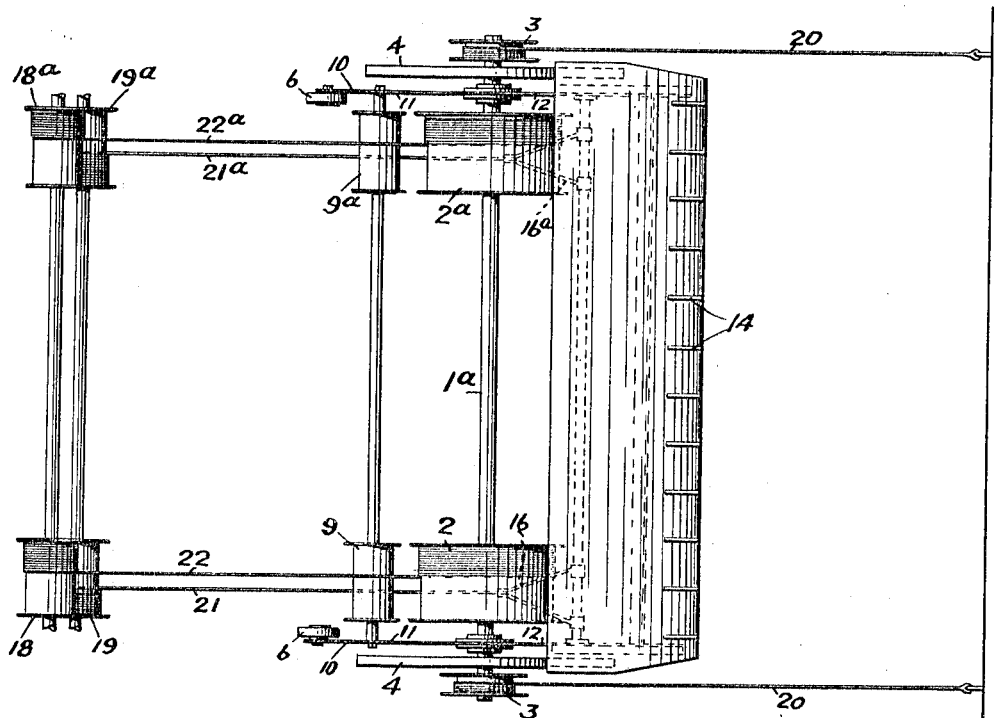

Figure 1, is a side view of a scraper embodying features of the invention and illustrating the same as it is drawn in or up to its work. Fig. 2, is a similar view showing the scraper plate held to the floor and bringing out all the cement which it will hold. Fig. 3, is a top plan view of Fig. 1, and Fig. 4, is a similar view illustrating a modification.

In the drawings there is a wheeled carriage having inter-connected differential drums. As shown the shaft 1, has fast upon it a drum 2, of large diameter and the drums 3, of smaller diameter, and this shaft 1, is mounted on wheels 4, arranged inside of the drums 3. There is a scraper frame turnably mounted on the carriage and provided with a scraper plate 5, a scraper guide 6, an operating cable attachment 7, and an operating cable guide 9, radially spaced in respect to each other.

As shown in the drawing the scraper frame consists of heads arranged inside of the wheels 4, and on the shaft 1, and these heads are provided with projecting arms 10, 11, 12 and 13, spaced radially around the shaft. The arms 12, at their ends carry the scraper plate 5, which is shown as curved about the shaft 1, as a center and provided on its outside with projecting teeth 14, spaced apart. The arms 10, carry at their ends the rollers 6, which constitute the scraper guide. The arms 11, carry the shaft 15, on which the roller constituting an operating cable guide 9, is mounted. The arms 13, are connected together by a draft gear 16.

18 and 19, are the drums of a windlass or hoist, and they are referred to herein as windlass drums. They may be geared together in such a way that they turn in opposite directions and are operated by a common motor or engine.

20, are anchor cables having one of their ends secured within the cement, for example to the back of the bin. The other ends of these cables are wound around the drums 3.

22, is an operating cable wound around the windlass drum 18, passed over the cable guide 9, and wound around the drum 2.

21, is an operating cable wound around the windlass drum 19, and secured to the draft gear 16.

The mode of operation may be described as follows: To run the scraper in or up to its work the windlass is run in one direction so that its drums turn, for example, as indicated by the arrows in Fig. 1; thus the cable 22, is wound on the drum 18, and the cable 21, is unwound from the drum 19. The draft on the cable 22, operating on the guide 9, turns the roller 6, into position for resting on the floor and this draft also unwinds the cable 22, from the drum 2, thus turning the drum 2. The turning motion of the drum 2, winds up the anchor cables 20, on the drums 3, and thus the scraper is drawn in to the bin and up to its work. It will be observed that the pull on the cable 22, is applied to the drum 2, of large diameter and is transmitted by the drums 3, of small diameter to the anchor cables 20, and in this way the proper inward motion of the scraper is insured. When the scraper has been thus drawn in, the direction of motion of the windlass and of the drums 18 and 19, is reversed as shown in Fig. 2. This reversal of direction of motion of the drums plays out the cable 22, and winds up the cable 21. The pull on the cable 21, is transmitted by the gear 16, to the arms 13, and operates to turn the scraper plate downward through the cement onto the floor. During this turning motion the guide 9, takes up the slack or some of it in the cable 22. The continued operation of playing out the cable 22, and pulling in the cable 21, causes the carriage with the scraper plate on the floor to be drawn out along with as much cement as the plate can hold, it being understood that in the meantime the anchor cables 20, are unwound from the drums 3, and the operating cable 22, is wound up on the drum 2. During one operation of the scraper plate through the cement, the teeth 14, loosen the cement in preparation for the next operation of the scraper through the cement.

The construction and mode of operation of the modification shown in Fig. 4, are as has been above described except that the construction is intended for use where a comparatively wide scraper plate is employed. In Fig. 4, windlass drums are duplicated as shown at 18ᵃ and 19ᵃ, as are also the drum 2, and guide 9, as shown at 9ᵃ and 2ᵃ. The draft gear 16, is also duplicated as shown at 16ᵃ. The operating cables are duplicated as shown at 22ᵃ and 21ᵃ. The purpose of this duplication is to avoid transmitting the power through too great a length of shaft 1ᵃ, and this is accomplished by splitting the drums and their parts, or more accurately, by duplicating them so as to apply the power at the ends of the shaft instead of the middle.

It will be obvious that modifications may be made in details of construction and arrangement without departing from the spirit of the invention so that the latter is not to be limited concerning those matters nor in any way further than the prior state of the art may require.

What I claim is:

1. A cement scraper comprising the combination of a wheeled carriage having differential drums and their cables for drawing the device into working position, a scraper frame turnably mounted on the carriage and provided with a scraper plate and a scraper guide and an operating cable and a cable guide radially spaced in respect to each other, and reversely operating windlass drums for said operating cables, substantially as described.

2. A cement scraper comprising the combination of a wheeled carriage having drums and their cables for drawing the device into working position, a scraper frame turnably mounted on the carriage and provided with a scraper plate and a scraper guide and an operating cable and a cable guide radially spaced in respect to each other, and reversely operating windlass drums for said operating cables, substantially as described.

3. In a cement scraper the combination of a shaft having differential winding drums, anchor cables coöperating with the smaller drums, an operating cable coöperating with the larger drum, and wheels on the shaft, substantially as described.

4. In a cement scraper the combination of a wheeled shaft having drums, anchor cables coöperating with some of the drums, an operating cable coöperating with another of the drums, a scraper frame on the shaft provided with a floor guide and a guide coöperating with said operating cable, a second operating cable coöperating with the frame, and means for playing out one of said cables as the other is wound up, substantially as described.

5. A cement scraper comprising the combination of a wheeled shaft provided with drums, anchor cables coöperating with some of said drums, a scraper frame provided with a scraper plate and having a radial arm and a floor guide and a cable guide, an operating cable coöperating with the cable guide and with one of said drums to turn the scraper plate up and draw the scraper in, a second operating cable connected with said arm and operating to turn the scraper plate down onto the floor and draw the scraper out, and means for playing one of said operating cables out as the other is drawn in, substantially as described.

In testimony whereof I have hereunto signed my name.

ARNOLD HOCHSTRASSER.

Witnesses:
 CLIFFORD K. CASSEL,
 K. M. GILLIGAN.

---

Copies of this patent may be obtained for five cents each, by addressing the "Commissioner of Patents, Washington, D. C."